Patented Dec. 26, 1950

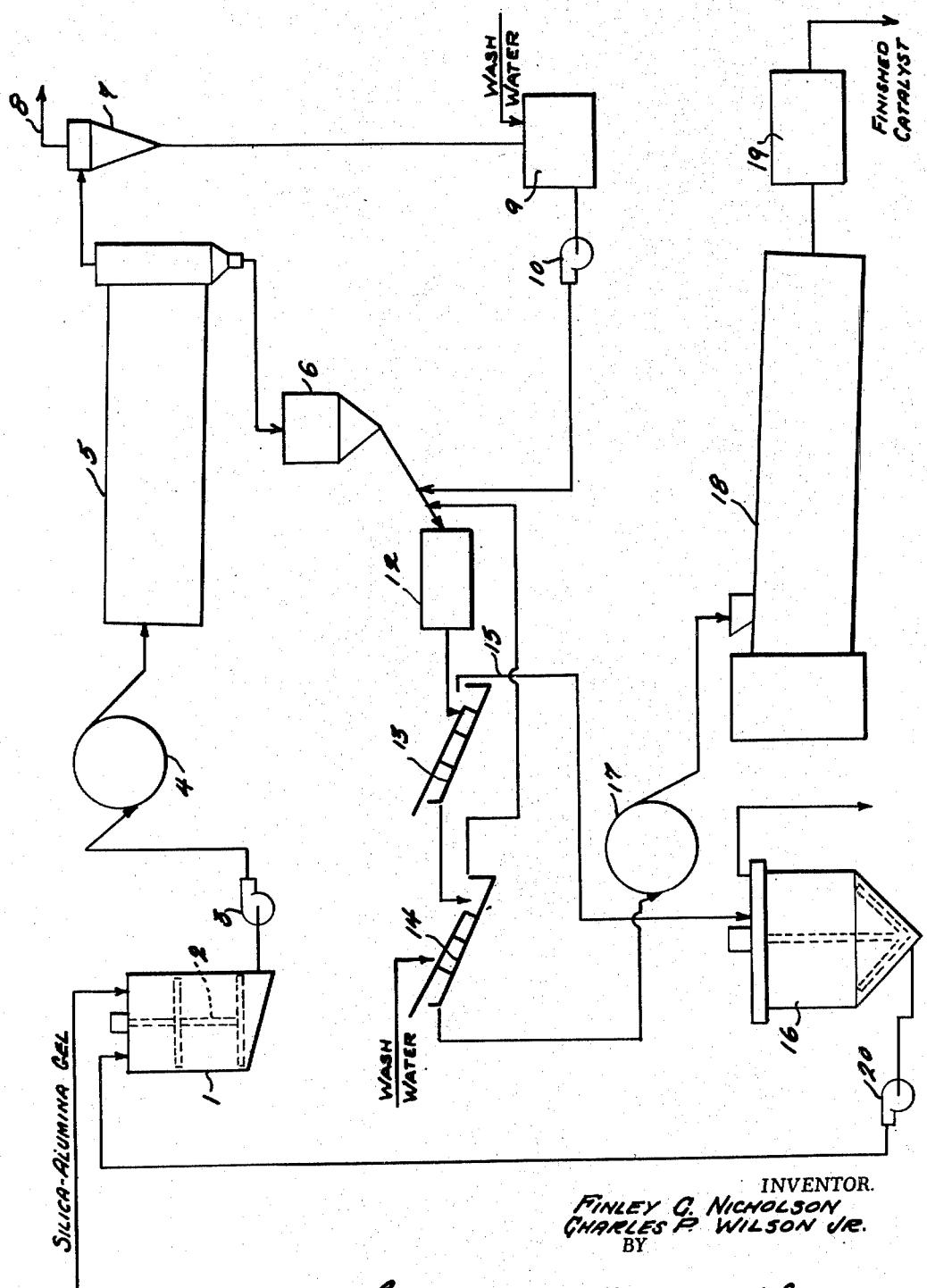

2,535,948

UNITED STATES PATENT OFFICE 2,535,948

INCORPORATION OF FINES IN A SILICA-ALUMINA CATALYST

Finley C. Nicholson and Charles Patton Wilson, Cincinnati, Ohio, assignors to The Davison Chemical Corporation, Baltimore, Md.

Application March 25, 1949, Serial No. 83,362

6 Claims. (Cl. 252—455)

This invention relates to the manufacture of a silica-alumina catalyst and more particularly to a method of preparing a silica-alumina fluid catalyst.

Catalysts used in fluid catalytic processes preferably have a particle size ranging from 20–80 microns. Any particles smaller than 20 microns are difficult to separate from the material being processed and cause large losses of catalysts. Catalyst particles larger than 80 microns are difficult to retain in suspension.

The preparation of catalysts having the desired particle size is accomplished by two general methods. In one method, the catalyst, in the form of a slurry or sol, is spray-dried to form microspheres, and in the other method, the catalyst is prepared in particles of a relatively large size and are ground to the desired particle size.

When fluid catalysts are prepared by grinding larger catalyst particles, the usual procedure is to dry the gel particles, wash them, and classify the particles into "fines" and an oversize product. The fines are returned, mixed with the unwashed gel and recycled through the drying and washing procedure, while the sized product is sent to mills for grinding. Heretofore, it has been the practice to maintain the fraction of fines returned for reprocessing as low as possible and still produce a product having an acceptable particle size. This practice followed the common practice in chemical processes of maintaining the recirculating load in a process as low as possible to increase the effective capacity of the plant.

It is an object of this invention to provide a method of preparing a fluid catalyst having maximum fraction of particles having a size in the 20–80 micron range.

Another object of this invention is to provide a method of treating silica-alumina gels in the preparation of a fluid catalyst which will increase the capacity of the mills employed in grinding the catalyst.

A further object of this invention is to provide an improved fluid catalyst of silica-alumina gels in which the ultimate silica-alumina catalyst is prepared by grinding to the desired size.

It is also an object of this invention to provide a novel method of manufacturing silica-alumina catalysts from silica-alumina gel in which the particles of gel are classified and the oversize product ground to form a fluid catalyst.

With these and other objects in view, this invention resides in preparing a silica-alumina gel catalyst suitable for use in fluid catalytic processes in which a slurry of precipitated gel is dried, washed, and classified. The classifying operation is performed in a manner to give a large fraction of fines which are returned to the slurry. The oversize product from the classifying procedure is then dried and ground to form a final product having an improved particle size distribution.

The single figure of the drawings is a flow sheet diagrammatically illustrating this invention as applied to a specific apparatus.

The silica-alumina gel treated according to this invention in the preparation of a catalyst may be prepared by the neutralization of a dilute solution of sodium silicate with an acid while vigorously agitated to precipitate a gel in a form which may be readily filtered. The resulting slurry may be further treated with acid to insure complete neutralization of the sodium silicate and then neutralized by the addition of ammonia, for example. The neutralized gel is agitated while aluminum sulfate is added thereto in quantities determined by the desired alumina concentration in the final catalyst. After the addition of the aluminum sulfate, the slurry is again neutralized to convert the aluminum present as aluminum sulfate to alumina. A slurry of silica-alumina gel prepared in this manner is readily filterable and composed of very fine particles suitable for the manufacture of fluid catalysts by either spray-drying or grinding methods. The method of preparing the slurry is set forth herein merely as an example of a method of preparing the silica-alumina gel which may be treated according to this invention in the manufacture of a fluid catalyst. This method of preparing the slurry is part of the invention of Thomas O. Tongue and Leon L. Baral, described in application Serial No. 70,362, entitled "Silica-Alumina Catalyst," and filed on January 11, 1949.

Referring to the drawings, the silica-alumina gel is delivered to a storage tank 1, equipped with an agitator 2 which maintains the gel particles in suspension. The contents of the storage tank are withdrawn by a pump 3 and delivered to a suitable filter 4 in which the mother liquid is separated from the gel particles to form a filter cake of silica-alumina gel. The filter cake from the filter 4 is delivered to a primary rotary drier 5 in which further moisture is removed from the filter cake and some agglomeration and cementing of the gel particles occurs. The dried gel particles discharged from the primary drier 5 are delivered to a suitable storage container 6 where they are held prior to further processing. Clearly, the storage container 6 is merely for convenience in operation and the product from the drier could go directly to the subsequent treating vessels.

Moisture laden gases from the drier 5 are passed through a cyclone separator 7 which removes entrained fines of gel from the gases. The gases are exhausted to the atmosphere through a suitable stack 8 and the fines separated in the cyclone 7 are dropped into a tank 9 where they are slurried with water. A pump 10 delivers the slurry from the tank 9 to the product discharged from the storage tank 6.

The dried silica-alumina gel from tanks 6 and 9 is delivered to a drum washer 12 where it is thoroughly mixed with wash water from subsequent washing operations. After thorough mixing in the drum washer 12, the slurry of silica-alumina gel is discharged into a rake classifier 13. Large, heavy particles of gel settle from the liquid in the classifier and are moved by the rake to the upper end of the classifier from which they are discharged into a second classifier 14. The liquid overflow from the lower end of the classifier 13 contains the fines of silica-alumina gel and is delivered through a line 15 to a thickener 16. Fresh wash water is added to the last rake classifier 14 and travels generally countercurrently to the gel particles for effective removal of the soluble salts therefrom. Gel particles discharged from the upper end of classifier 14 are delivered to a suitable filter 17 for dewatering and further processing.

The washing apparatus has been represented in the drawings diagrammatically by a washing drum and two classifiers. Actually, the washing apparatus may be quite complicated. For example, in one installation employing this invention, a washing drum similar to drum 12 was followed with three rake classifiers in series, a second washing drum with four rake classifiers in series, and a third washing drum with three rake classifiers. The flow of the wash water was counter-current to the flow of the silica-alumina gel through the classifiers and concurrent with the gel through the washing drums. In many instances, it is desirable to modify the washing by the addition of acids or alkaline material at various points in the washing apparatus.

The filter cake of silica-alumina gel from filter 17 is passed through a secondary drier 18 from which it is delivered to grinding mills 19. Grinding mills 19 may be of any type suitable for grinding to a particle size of 20–80 microns.

Thickener 16 may be of any conventional type, such as the Dorr thickener, adapted for the separation of fine particles from a liquid. The fine particles of silica-alumina catalyst present in the overflow from classifier 13 settle from the liquid to the bottom of thickener 16. A pump 20 is provided for delivery of the sludge of fines from the bottom of the thickener 16 to the storage tank 1 where it is mixed with the original silica-alumina slurry. The liquid overflow from thickener 16 is discharged to the sewer.

It has been discovered that if the fines returned from the bottom of the thickener 16 to the slurry in tank 1 are increased, the particle size of the final product from the grinding mills 19 is improved. The quantity of fines may be controlled by varying the manner of operation of the classifiers 13 and 14 to suspend a larger fraction of the silica-alumina slurry in the overflow passing through line 15 to the thickener. For example, the rate of travel of the rakes, the flow rate of the wash water, and the slope of the classifiers will influence the fraction of the gel classified as fines. In some instances it may be desirable to deliver the fines separated from the exhaust gases from drier 5 directly from the storage tank 9 to tank 1. If this procedure is followed, the fraction of fines may be controlled by varying the draft on drier 5.

Before this invention it was the practice to reduce the fraction of fines returned to the storage tank 1 to as low a value as possible. In this manner, the load circulating through the filter 4, primary drier 5, and the washing apparatus was held at a minimum. It was also thought that returning the minimum amount of fines would produce a product having better size characteristics. Ordinarily, the fines returned in the earlier processes were about 20% of the silica-alumina gel passing through the classifiers. Operating in this manner resulted in a final product from the grinding mills 19 having a representative roller analysis and screen test as follows:

Screen test

| | Per cent |
|---|---|
| Plus 100 mesh | 5.3 |
| Minus 200 mesh | 55.7 |

Roller analysis

| | Per cent |
|---|---|
| 0 to 20 microns | 16 |
| 20 to 40 microns | 17 |
| 40 to 80 microns | 23 |
| +80 microns | 44 |

Increasing the fines returned to the original slurry and recirculated through the primary drier and washers improved the yield of catalysts in the 20–80 micron size. For example, when 36% of the silica-alumina gel entering the classifiers were returned as fines, the final product discharged from the grinding mills 19 had the following roller analysis and screen test:

Screen test

| | Per cent |
|---|---|
| Plus 100 mesh | 3.3 |
| Minus 200 mesh | 50.6 |

Roller analysis

| | Per cent |
|---|---|
| 0 to 20 microns | 11.5 |
| 20 to 40 microns | 15.5 |
| 40 to 80 microns | 39.0 |
| +80 microns | 34.0 |

A comparison of the analysis of the product from the method of the prior art and the product prepared according to this invention shows an increase from 40 to 54½% in the 20–80 micron size. This is an increase of over ⅓ in the amount of 20–80 micron catalyst resulting from this invention.

Apparently the passage of an increasing amount of fines through the primary drier 5 results in a product discharged therefrom more suitable for grinding in the mills 19. The improved results may also be caused by a change in the characteristics of the product discharged from the secondary drier resulting from the introduction of a smaller amount of fines into that drier. In any event, operation according to this invention results in an increased capacity in the grinding mills as well as an improvement in the particle size of the product discharged therefrom. When about 20% of the silica-alumina gel entering the classifiers was separated as fines and returned to the silica-alumina precipitated gel slurry, the capacity of the grinding mills was about thirty tons per day. A change in the operation to return about 36% fines resulted in an increase in capacity in the grinding mills to about fifty-five tons per day.

While this invention has been described in detail with respect to a particular modification of the invention, it is to be understood that the concept of this invention is not limited to those details. For instance, the prior practice of maintaining the fines recycled in the preparation of catalysts from prepicitated silica-alumina gels at a minimum usually resulted in about 20–25% fines being returned. If the present invention is employed to obtain an improved silica-alumina fluid catalyst the fines returned may range from about 30 to about 60% of the fresh silica-alumina.

We claim:

1. A method of manufacturing silica-alumina catalyst comprising forming a slurry of silica-alumina gel, drying the gel whereby the particles of the slurry are agglomerated, washing the dried gel, classifying the gel into fines and oversize, said fines comprising at least about 30% of the gel classified, returning the fines to the slurry, and drying and grinding the oversize to form the catalyst.

2. A method of manufacturing a silica-alumina catalyst having a particle size substantially ranging from 20 to 80 microns comprising forming a slurry of precipitated silica-alumina gel, drying the precipitated gel, washing the dried gel, classifying the washed gel into an oversized product and fines, the amount of fines separated being about 30 to 60% of the fresh gel in the slurry, returning the fines to the slurry, and grinding the oversized product to a particle size of about 20 to 80 microns.

3. A method of manufacturing a silica-alumina catalyst having a particle size substantially ranging from 20 to 80 microns comprising forming a slurry of precipitated silica-alumina gel, drying the precipitated gel, washing the dried gel, classifying the washed gel into an oversized product and fines, the amount of fines separated being about 35% of the fresh gel in the slurry, returning the fines to the slurry, and grinding the oversized product to a particle size of about 20 to 80 microns.

4. A method of manufacturing a silica-alumina catalyst having a particle size substantially in the range of 20 to 80 microns comprising forming a slurry of precipitated silica-alumina gel, drying the precipitated gel, classifying the dried gel into an oversized product and fines, the amount of fines separated being about 30 to 60% of the fresh silica-alumina gel, recycling the fines to the slurry, and washing, drying and grinding the oversized product to form a catalyst having a particle size ranging from about 20 to 80 microns.

5. A method of manufacturing a silica-alumina catalyst having a particle size substantially in the range of 20 to 80 microns comprising forming a slurry of precipitated silica-alumina gel, drying the precipitated gel, classifying the dried gel into an oversized product and fines, the amount of fines separated being about 35% of the fresh silica-alumina gel, recycling the fines to the slurry, and washing, drying and grinding the oversized product to form a catalyst having a particle size ranging from about 20 to 80 microns.

6. In a method of manufacturing a silica-alumina catalyst for fluid catalytic processes in which a slurry of precipitated silica-alumina gel is dried, classified, washed and ground to a particle size of about 20–80 microns, the improvement comprising classifying the gel into an oversized product for grinding and fines in an amount equivalent to about 30 to 60% of the fresh silica-alumina gel, and recycling the fines to the slurry of precipitated gel.

FINLEY C. NICHOLSON.
CHARLES PATTON WILSON.

REFERENCES CITED

The following references are of record in the file of this patent:

UNITED STATES PATENTS

| Number | Name | Date |
|---|---|---|
| 2,146,718 | Bond | Feb. 14, 1939 |
| 2,405,408 | Connolly | Aug. 6, 1946 |
| 2,417,054 | Bond | Mar. 11, 1947 |
| 2,481,841 | Hemminger | Sept. 13, 1949 |